Feb. 23, 1971     J. B. COLLINS ET AL     3,564,916
APPARATUS FOR MEASURING FLUID FLOW
Filed June 4, 1969     4 Sheets-Sheet 1

FIG. I.

INVENTORS
JACK B. COLLINS, DECEASED
BY DOROTHY M. COLLINS AND
JOHN M. COLLINS, EXECUTORS
AND RICHARD M. D. SAW
by: Wolfe, Hubbard, Voit & Osann ATTORNEYS

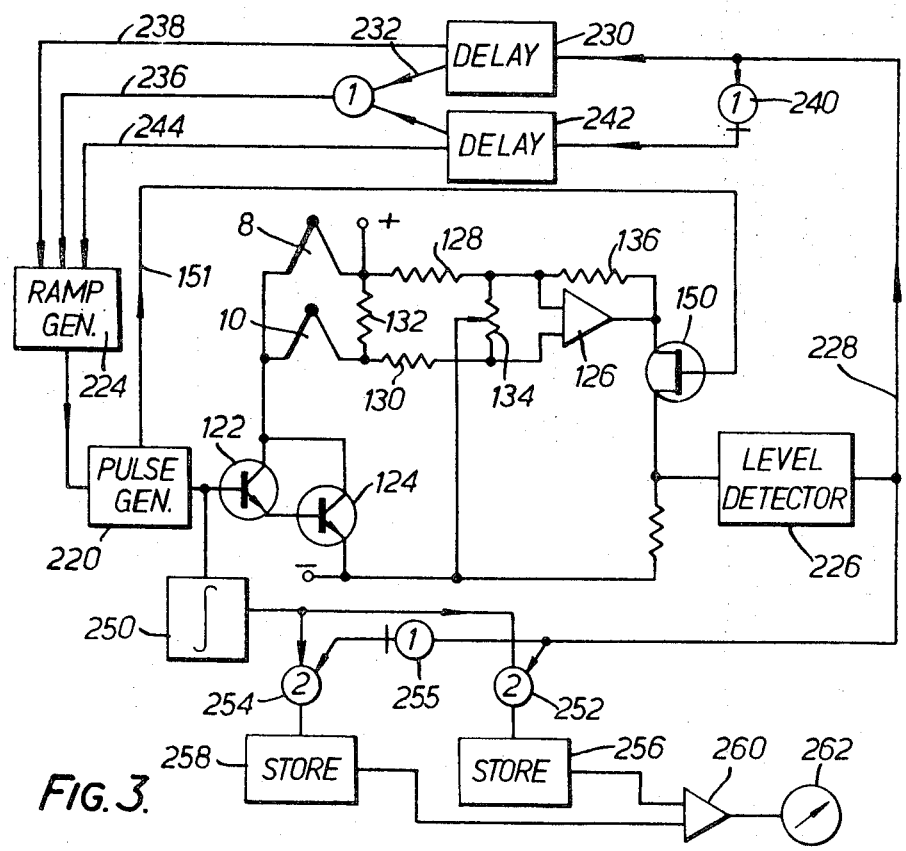
FIG. 3.
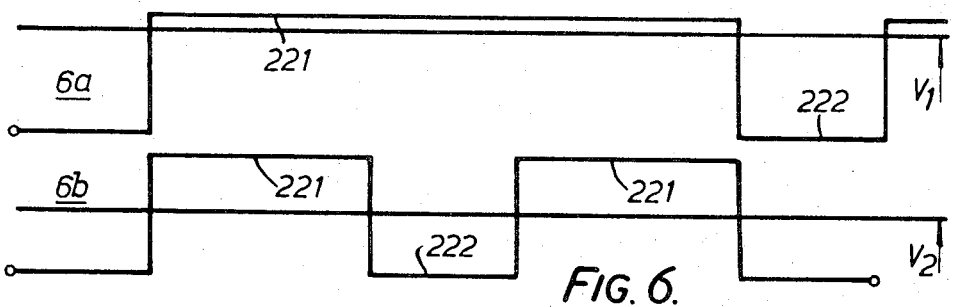
FIG. 4.
FIG. 6.

United States Patent Office 3,564,916
Patented Feb. 23, 1971

3,564,916
APPARATUS FOR MEASURING FLUID FLOW
Jack B. Collins, deceased, late of Isleworth, by Dorothy M. Collins and John M. Collins, executors, Isleworth, and Richard M. D. Saw, Staines, England, assignors to Graviner Colnbrook Limited, London, England, a British company
Filed June 4, 1969, Ser. No. 832,039
Claims priority, application Great Britain, June 8, 1968, 27,350/68
Int. Cl. G01p 5/10
U.S. Cl. 73—204                          13 Claims

ABSTRACT OF THE DISCLOSURE

Fluid-flow responsive apparatus comprises two thermocouple junctions, both mounted in the fluid, connected to an amplifier input. An energizing circuit, including a series-connected switching transistor, is controlled by a variable mark/space ratio pulse generator. During on-periods of the pulse generator the energizing circuit feeds heating current through both junctions. One junction is heated to a higher temperature because the other has relatively high resistance connected to it. A diode across the amplifier provides substantially complete negative feedback across it during the on-periods. During the off-periods, the transistor is OFF and the thermocouple E.M.F. drives the amplifier, the diode across the amplifier now being cut off. The thermocouple E.M.F. is thus dependent on the rate of loss of heat from the hotter of the two thermocouple junctions, and thus on the fluid flow. The mark/space ratio of the pulse generator is adjusted until the mean amplifier output has a predetermined value, at which time the mark/space ratio represents the rate of fluid flow.

In another embodiment, the mark/space ratio is automatically varied such that the amplifier output continuously cycles between two fixed limits, and a comparator measures the difference between the two values of the mark/space ratio necessary to achieve these two limits, the comparator output being a measure of the fluid flow rate.

BRIEF SUMMARY OF THE INVENTION

The invention relates to apparatus responsive to fluid flow.

According to the invention, there is provided fluid-flow responsive apparatus, comprising thermocouple means, an electrical multivibrator circuit operative to produce a series of electrical output pulses and operative to cause a heat input to be applied to at least one junction of the thermocouple means for the duration of each said pulse whereby to heat the said one junction to a higher temperature than another junction of the thermocouple means, output means operative in response to the thermocouple E.M.F. produced by the two junctions between the said pulses for producing an electrical output signal which is dependent on the rate of fluid flow when the said one junction is in heat-exchanging relationship with the fluid, and indicating means operative to produce an indication dependent on the said heat input which indication is indicative of the fluid flow rate.

According to the invention, there is also provided fluid flow responsive apparatus, comprising electrical pulse generating means, a pair of thermocouple junctions connected to supply thermocouple E.M.F. to amplifying means, means arranged to connect an electrical energizing circuit to the thermocouple for the duration of each on-period of the pulse generating means whereby one junction is resistively heated to a higher temperature than the other, means for opposing the input to the amplifying means during the on-periods of the pulse generating means, and means operative to adjust the mark/space ratio of the pulse generating means to set the mean output of the amplifying means to a predetermined value, whereby the said ratio is a measure of the rate of fluid flow when the said one junction is in heat-exchanging relationship with the fluid.

According to the invention, there is further provided fluid flow responsive apparatus, comprising a pair of thermocouple junctions, electrical pulse generating means operative to cause a heat input to be applied to at least one junction for the duration of each on-period of the pulse generating means whereby to heat the said one junction to a higher temperature level than the other junction, output means operative in response to the thermocouple E.M.F. produced by the two junctions during the off-periods of the pulse generating means for producing an electrical output signal which is dependent on the rate of fluid flow when the said one junction is in heat exchanging relation with the fluid, control means operative in response to the said output signal to repeatedly vary the lengths of the on-periods such that the output signal cycles between a predetermined upper level and a predetermined lower level respectively representing relatively high and relatively low temperature differences between the two said junctions, and indicating means operative to compare the lengths of the on-periods when the output signal reaches the upper level with the lengths of the on-periods when the output signal reaches the lower level so as to produce an indication dependent on the results of the comparison and indicative of the fluid flow rate.

DESCRIPTION OF THE DRAWINGS

Fluid-flow responsive apparatus embodying the invention will now be described by way of example and with reference to the accompanying drawings in which:

FIG. 3 is a circuit diagram of a further form of the apparatus; and

FIGS. 4 to 6 shows waveforms occurring in the form of apparatus of FIG. 3.

DETAILED DESCRIPTION

Figure 1:
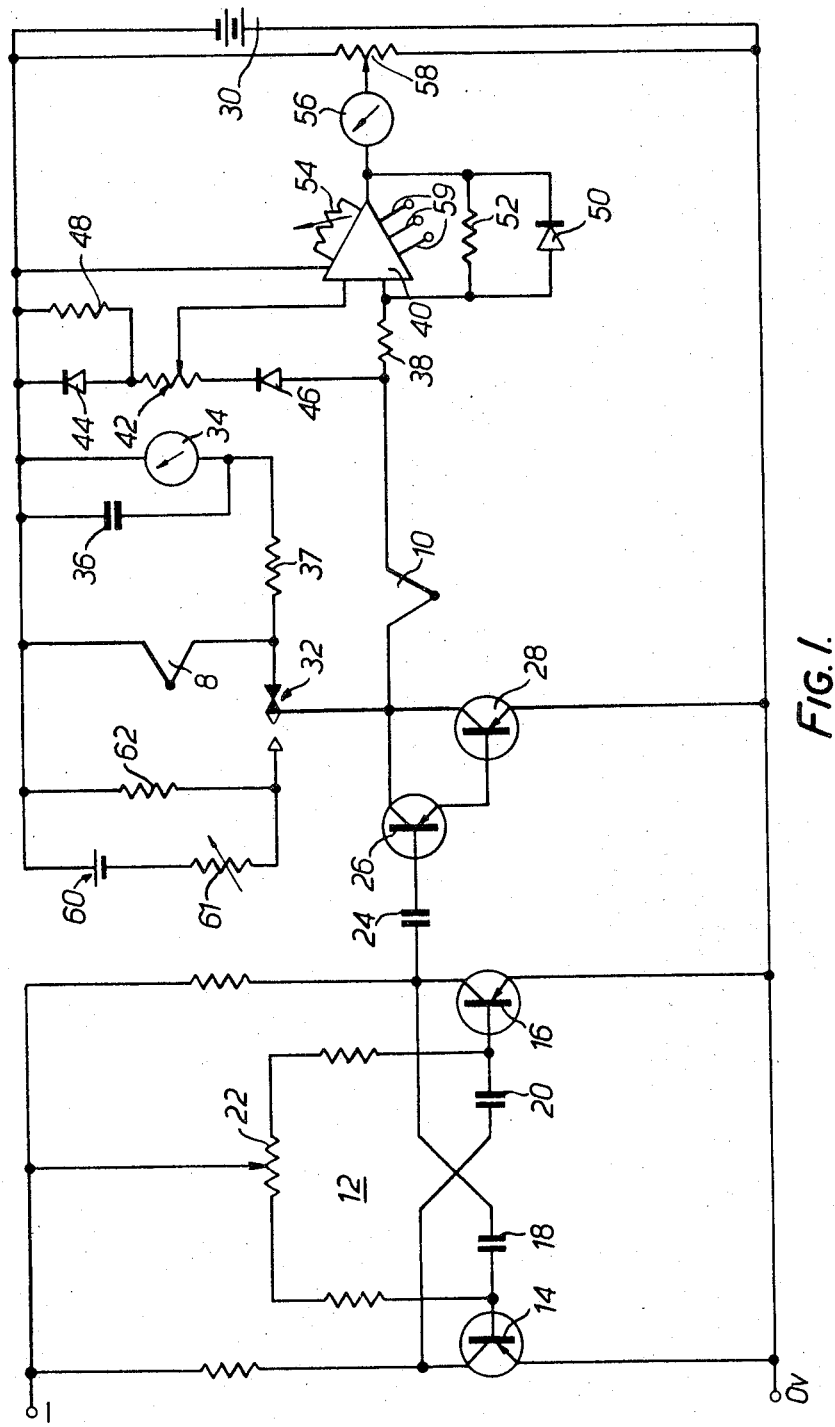
FIG. 1 is a circuit diagram of one form of the apparatus.

The apparatus of FIG. 1 comprises a thermocouple whose hot and cold junctions 8 and 10 respectively are both located in the path of the fluid whose flow rate is to be sensed. As will be explained in detail below, the apparatus is arranged, in accordance with the invention, to supply electrical heating current periodically to the hot junction 8, so as to heat it resistively, the thermocouple E.M.F. produced by the two junctions during the intervening periods when the heating current is switched off being a measure of the rate at which heat is dissipated from the hot junction by the fluid and thus a measure of the fluid flow rate.

The apparatus is energised by a multivibrator circuit 12 which is powered by a low capacity battery, and includes a pair of p.n.p. transistors 14, 16, each having its base connected to the collector of the other through a respective capacitor 18, 20 so that the transistors conduct alternately at a fixed frequency. A variable bias supply for the base electrodes of the transistors is fed through a potential divider 22 which is adjustable so as to vary the mark/space ratio of the output from the multivibrator circuit. This output is taken from the collector of transistor 16 and fed through a capacitor 24 to the base of an amplifying transistor 26 which controls a switching transistor 28.

The switching transistor 28 controls the periodical energization of the hot junction 8 of the thermocouple, the energization being supplied from two nickel-cadmium cells 30. The hot junction 8 is connected to the collector of transistor 28 through a switch 32; a volt meter 34 (calibrated in terms of fluid flow), shunted by a capacitor 36 and in series with a resistor 37, is also connected to the collector of the transistor 28 through the switch 32.

The cold junction 10 of the thermocouple is connected, in series with a resistor 38, between the inverting input of a differential amplifier 40 and the collector of transistor 28. The non-inverting input of the amplifier 40 is connected to the adjustable slider of a potential divider 42 which is connected in series with two diodes 44 and 46, diode 44 being shunted by a resistor 48 and diode 46 being connected to be supplied from the collector of transistor 28 through the cold junction 10. The amplifier 40 has a feed back path comprising a diode 50 connected in parallel with a high value resistor 52. A variable resistor 54 is provided to balance the amplifier. The output of the amplifier is fed through a microammeter 56 to a tapping on a potential divider 58 which is connected across the cells 30. A power supply for the amplifier is obtained by means of lines 59 connected to a battery not shown.

The operation of the circuit will now be described.

Initially, with no fluid flow over the junctions 8 and 10, the potential divider 22 is adjusted so that the mark/space ratio of the multivibrator output is very low, that is, the transistor 28 is switched on only for a very small proportion of each multivibrator cycle (which, because of the fixed frequency of the multivibrator, has a fixed length). During each on-period of transistor 28, electrical current from the cells 30 passes through the hot junction 8 of the thermocouple and resistively heats it. In addition, current flows through the cold junction 10, though, because of the relatively high resistance of the path for the current flowing through the cold junction, the heating effect on the cold junction is negligible.

Therefore, during each on-period, the hot junction 8 is resistively heated to a slightly higher temperature than the cold junction 10 and thus a very low level thermocouple E.M.F. is produced during each subsequent off-period of the transistor. During each such off-period, therefor, the thermocouple provides a low negative E.M.F. to the inverting input of amplifier 40. Diodes 44, 46 and 50 are cut off, and the non-inverting input of the amplifier is connected to the negative supply line through resistor 48. Under these conditions, the low thermocouple E.M.F. is amplified by amplifier 40 (resistor 52 providing normal negative feed back) and a small output is produced.

During each on-period of transistor 28, the resultant positive pulse at the collector of transistor 28 is applied to the inverting input of amplifier 40 so that diode 50 conducts and provides maximum negative feedback. At the same time, current flows through diodes 44 and 46 and the resultant potential produced across diode 44 (which is a similar type of diode 50), together with an additional voltage dependent on the setting of potential divider 42, is applied to the non-inverting input of amplifier 40. The voltage drops across the diodes 44 and 50 substantially balance each other so that the output of amplifier 40 is dependent only on the setting of the potential divider 42. The potential divider 58 is pre-set to balance the amplifier output so that the pointer of the meter 56 is held in its central zero position.

Under the no-flow condition described above, because the length of the on-periods of transistor 28 is very short the mean voltage developed across meter 34 is small and is balanced electrically or mechanically so that the pointer thereof indicates zero flow.

It will now be assumed that fluid flows over the thermocouple junctions. This fluid flow will dissipate heat from the hot junction 8 so that, with the potential divider 22 unaltered, the thermocouple E.M.F. during the off-periods of transistor 28 will be lower. Therefore the output of amplifier 40 during the off-periods of transistor 28 will be lower and the pointer of meter 56 will be deflected from its central position. The operator therefore adjusts potential divider 22 so as to increase the lengths of the on-periods of transistor 28 (producing a corresponding decrease in the lengths of the off-periods) until the pointer of meter 56 is again at the central position, indicating that the increased heat input to the thermocouple hot junction 8 during the lengthier on-periods of transistor 28 has compensated for the heat dissipated by the fluid flow. The flow rate is indicated on the volt meter 34 whose pointer is deflected from its zero position by the increased mean voltage produced thereacross as a result of the lengthier on-periods of transistor 28.

Therefore, whenever the flow rate changes, resulting in deflection of the pointer of meter 56 from its central position, the operator merely has to adjust potential divider 22 as necessary to bring the pointer of meter 56 back to the central position whereupon the new flow rate is indicated on meter 34.

From the above, it will be seen that the output amplitude of amplifier 40 during the on-periods of transistor 28 is always the same irrespective of the length of the on-periods, being dependent only on the pre-set position of the slider of potential divider 42. Furthermore, under balanced conditions the mean output amplitude of the amplifier 40 during the off-periods is also always the same. In a manner to be explained, the potential divider 42 is pre-set so that the amplifier output during the on-periods of transistor 28 is equal to the mean amplifier output (resulting from the thermocouple E.M.F.) during the off-periods.

This feature ensures that the same balance condition obtains under all flow rates. If the circuit operation were such that the output amplitude of amplifier 40 during the on-periods were not always the same as the mean output amplitude at balance during the off-periods, there would be a non-linear relationship between the reading of meter 34 and the flow rate. This would arise because the increase in length of the on-periods necessary to balance the meter 56 as the flow rate increased would have to be disproportionate to the increase of flow rate, in order to compensate for the fact that the length of the off-periods, over which periods the meter 56 integrates the amplifier output, becomes shorter as the flow rate increases. Thus, if, for example, potential divider 42 were omitted so that the amplifier 40 produced no output during the on-periods, the circuit could still be zeroed by adjustment of divider 58 but an increase in flow rate would require a disproportionately greater lengthening of the on-periods in order to ensure that the mean thermocouple E.M.F. produced during the off-periods (which would now be shorter) was sufficient to balance the potential tapped off the divider 58. With the circuit arrangement described, the length of the on-periods necessary to balance the meter 56 increases proportionately with flow rate. Thus the mean voltage applied across voltmeter 34 increases proportionately with flow rate, and the meter 34 can thus be calibrated conveniently in terms of flow.

In order to set up the circuit arrangements, a 1½ volt standard cell 60 is provided which is connected in series with an adjustable resistor 61 to supply a calibrated resistor 62 having a very low, or zero, resistance/temperature coefficient. Resistor 61 is adjusted so that a voltage equivalent to that obtained from the thermocouple under no-flow conditions (that is, with divider 22 set to its minimum setting) is produced across resistor 62. In order to set up the circuit the amplifier output is set to zero, with no signals at its inputs, by adjustment of resistor 54. The potential divider 42 is then set to its minimum output setting, that is, to apply the minimum voltage to the non-inverted input of amplifier 40. Switch 32 is then operated to connect resistor 62 into circuit in place of the hot junction 8 of the thermocouple. The potential divider 42 is then adjusted so as gradually to increase the voltage applied therefrom to the non-inverted input of amplifier 40 and, at the same time, potential divider 22 is repeatedly swept back and forth through its range so as to vary the lengths of the on and off periods of transistor 28 between the extreme limits thereof. This process is continued until a setting of potential divider 42 is reached at which variation of potential divider 22 has no effect on the pointer of meter 56. This indicates that the voltage applied from potential divider 42 to the non-inverted input of amplifier 40 during the on-periods of transistor 28 is such that the amplifier output produced thereby is exactly equal to the amplifier output produced during the off-periods of transistor 28 (this latter output resulting from the voltage across resistor 62). This is the desired operating condition as explained above. The pointer on meter 56 is then adjusted to the central zero position by means of potential divider 58 and the circuit is ready for use after re-setting switch 32 to the operating position.

The apparatus of FIG. 2 will now be described.

Figure 2:
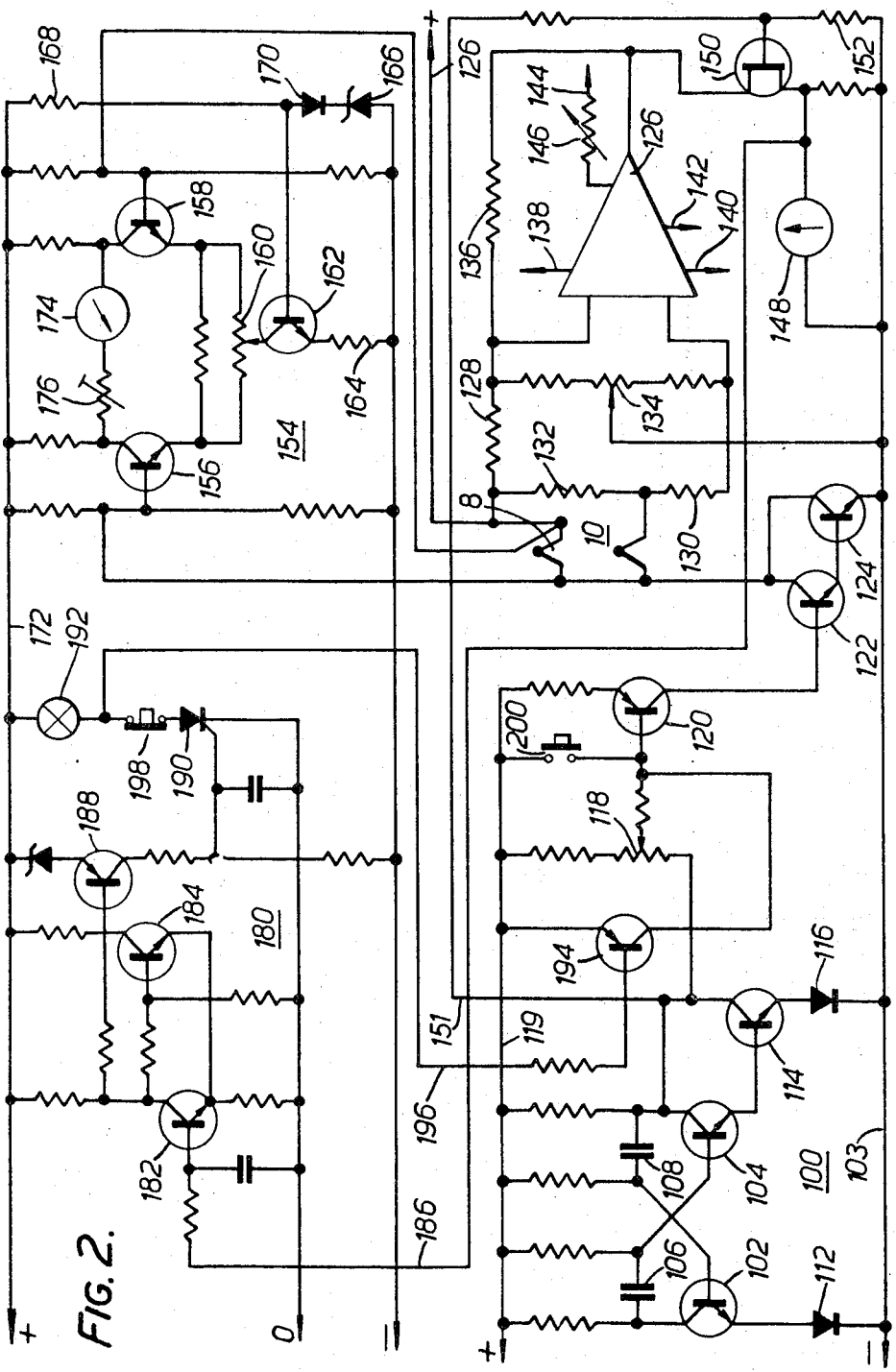
FIG. 2 is a circuit diagram of another form of the apparatus.

Like the apparatus of FIG. 1, the apparatus of FIG. 2 comprises a thermocouple whose hot and cold junctions 8 and 10 respectively are both located in the path of the fluid whose flow rate is to be sensed. The apparatus is, like the apparatus of FIG. 1, arranged to supply electrical heating current periodically to hot junction 8, so as to heat it resistively, the thermocouple E.M.F. produced by the two junctions during the intervening periods when the heating current is switched off being a measure of the rate at which heat is dissipated from the hot junction by the fluid and thus a measure of the fluid flow rate.

The apparatus is energized by a multivibrator circuit 100 which is powered by a battery (not shown) and includes a pair of NPN transistors 102, 104, each having its base connected to the collector of the other through a respective capacitor 106, 108, so that the transistors conduct alternately at a fixed frequency. Unlike the multivibrator circuit 12 of the apparatus of FIG. 1, the multivibrator circuit 100 has a fixed bias supply through resistors 110, and thus has a fixed mark/space ratio. The emitter of the transistor 102 is connected to the negative supply line 103 through a diode 112, while the emitter of the transistor 104 is connected to the negative supply line through the base-emitter path of a further NPN transistor 114 and a diode 116. The output from the multivibrator circuit 100 is taken from the collector of transistor 104 by a line which is connected to the collector of transistor 114 and to one end of an adjustable potential divider 118 whose other end is connected to the positive supply line 119. The adjustable tapping of the potential divider 118 controls an amplifying transistor 120 which in turn controls two further transistors 122 and 124.

The transistor 124 controls the periodic energization of the hot junction 8 of the thermocouple, the energization being supplied via a positive supply line 126 and being controlled by the conduction of transistor 124.

The hot junction 8 is connected to one input of a differential operational amplifier 126 through a resistor 128, while the cold junction 10 is connected to the other input of the amplifier 126 through a similar resistor 130. A relatively high resistor 132 is connected between the hot and cold junctions 8 and 10.

A potential divider 134 is connected across the two inputs of the amplifier 126 for adjustment purposes, and the amplifier has a feedback resistor 136. The amplifier receives power supplies by means of terminals 138, 140, 142, and 144, the latter having an adjustable resistor 146 connected in series with it for zeroing of the amplifier output.

The amplifier output is fed to a null indicating meter 148 through a field effect transistor 150 whose gate electrode is connected to the output of the multivibrator circuit 100 by a line 151 and to the negative supply line 103 by a high resistor 152.

The power supplied to the hot junction 8 of the thermocouple during the heating periods is monitored by an amplifier circuit 154 comprising a pair of NPN transistors 156 and 158 having their bases respectively connected to the two ends of the junction 8 of the thermocouple. The emitters of the two transistors are connected through an adjustable potential divider 160 to a common emitter circuit comprising an NPN transistor 162 and a resistor 164, the base of the transistor 162 being supplied with a relatively constant voltage via a Zener diode 166 which is supplied, through a resistor 168 and a diode 170, from a positive supply line 172. A power indicating meter 174, which is calibrated in terms of fluid flow, is connected between the collectors of the two transistors 156 and 158 by an adjustable resistor 176.

The operation of the circuit will now be described.

Each time the multivibrator circuit 100 goes ON, that is, transistors 104 and 116 are rendered conductive, a negative voltage, having an amplitude dependent on the setting of the adjustable potential divider 118, is applied to the base of transistor 120 and turns on transistor 124 to an extent dependent on the setting of divider 118. A heating current, having a magnitude dependent on the setting of divider 118, therefore flows through the hot junction 8 and resistively heats the junction. The heating current flowing through junction 10 is negligible because of resistor 132. During these ON periods, the field effect transistor 150 is held off by the negative voltage on the line 151, and consequently the output produced by amplifier 126, as a result of energization of the thermocouple junction 8 through transistor 124, is blocked from meter 148.

During the OFF periods of the multivibrator circuit 100, transistors 104 and 116 are non-conductive, and therefore transistors 120, 122 and 124 are also non-conductive and no heating current is applied to junction 8. Transistor 150 is now ON, and therefore the output from amplifier 126, resulting from the thermocouple E.M.F. produced by the temperature difference between the junctions 8 and 10, is registered on meter 148.

In order to set up the circuit, meter 174 is set to zero by means of potential divider 160 with no fluid flow over the junctions 8 and 10, and potential divider 118 is set near, but not at, its minimum setting. Resistor 146 is then adjusted to set meter 148 to zero. When fluid commences to flow over the junctions 8 and 10, the thermocouple E.M.F. produced by the junctions during the OFF periods of multivibrator circuit 100 will be reduced by the cooling effect of the fluid. The output of amplifier 126 thus increases, and deflects meter 148. The operator then adjusts the potential divider 118 so as to increase the heating power applied to junction 8 until this is sufficient to compensate for the heat carried away by the fluid flow over the junctions; this condition is indicated by a null reading on the meter 148 signifying that the output of the amplifier 126 during the OFF periods has been brought back to zero. The reading on meter 174 at this time will be a measure of the increased power input being supplied to the hot junction 8 during the ON periods, and can be read off as a fluid flow rate.

The circuit of FIG. 2 includes means for protecting the junction 8 from overheating as a result of excessive power dissipation; such overheating might otherwise occur if, for example, the potential divider 118 were inadvertently set at too high a level or if the nature of the fluid changed and altered the rate of heat transfer from the junction. This protective circuitry comprises a Schmitt trigger circuit 180 having a pair of NPN transistors 182 and 184. The base of the transistor 182 is connected, via a line 186, to receive the output of the amplifier 126 during the OFF periods of the multivibrator circuit 100. The output from the Schmitt trigger circuit 180 is taken through an amplifier transistor 188 and controls the gate electrode of a silicon controlled rectifier 190. The latter is connected in series with a warning lamp 192 and an output is taken from its anode to a PNP transistor 194 by means of a line 196. The collector of transistor 194 is connected to the base of transistor 120.

When the dissipation in the junction 8 becomes too high, as indicated by the output from amplifier 126 becoming excessively positive during the OFF periods of multivibrator circuit 100, the Schmitt trigger circuit 180 is switched into the condition in which transistor 182 conduct whereupon the SCR 190 is switched on and the warning lamp 192 is lit. The resulting current flowing in line 196 switches on transistor 194 and shorts the base of transistor 120 to the positive supply line 119 thus switching the latter off and thereby interrupting the heating current.

When the overload condition has been removed, the circuit can be reset by depression of a switch which opens contacts 198 and closes contacts 200. The conduction of the SCR 190 is therefore halted, and the circuit resumes normal operation when the push button is released thus opening contacts 200. The provision of the latter contacts ensures that the protection given by th Schmitt trigger circuit 180 cannot be overridden by holding contacts 198 open.

A further form of apparatus embodying the invention will now be described with reference to FIGS. 3, 4, 5, and 6.

FIG. 3 illustrates this form of the apparatus partially in block diagram form. This form of the apparatus has, like the other two forms of apparatus described, a thermocouple whose hot and cold junctions 8 and 10 respectively are both located in the path of the fluid whose flow rate is to be sensed. The hot junctions 8 and 10 are connected to the two inputs of the operational differential amplifier 126 in similar fashion to the apparatus of FIG. 2, and items in FIG. 3 corresponding to items in FIG. 2 are similarly referenced. The power supplies for the amplifier 126 are omitted from FIG. 3.

Instead of the multivibrator 100, the apparatus of FIG. 3 has a pulse generator 220 whose mark/space ratio is variable but whose amplitude is constant. By means of the line 115, the pulse generator 220 switches off the field effect transistor 150 for the duration of each ON period, or mark pulse, of the pulse generator. During each ON period of the pulse generator 220, the transistors 122 and 124 are switched on, and a current pulse is supplied through the hot junction 8 and resistively heats the junction, the heating power supplied depending on the length of the ON period of the pulse generator.

The pulse generator 220 is controlled by a ramp generator 224. The length of each ON period of the pulse generator 220 is directly proportional to the instantaneous amplitude of the output from the ramp generator 224. The ramp generator 224 is controlled by a level detector circuit 226 which senses the output from the differential amplifier 126 during the OFF periods of the pulse generator 220, that is, the output resulting from the thermocouple E.M.F. When the output from the differential amplifier 126 reaches a predetermined upper level, the detector circuit 226 energizes a line 228 which triggers a delay circuit 230. When triggered, the delay circuit produces a control pulse on a line 232 which, through an OR gate 234 and a line 236, halts the ramp generator 224 so that its output amplitude is held constant and thus holds constant the mark/space ratio of the pulse generator 220. At the end of the delay period established by the circuit 230, a pulse is generated on a line 238 which causes the ramp generator output to decrease linearly. When the level detector 226 senses that the amplifier output has fallen to a predetermined lower level, it de-energizes line 228 and, via an inverter 240, triggers a second delay circuit 242. When triggered, the latter, by means of the OR gate 234 and line 236, halts the ramp generator 224 so that the latter holds constant the mark/space ratio of the pulse generator 220. At the end of the delay period established by the delay circuit 242, the latter energizes a line 244 which restarts the ramp generator 224 with a linearly increasing amplitude.

When the level on line 228 has been changed as a result of the level detector circuit 226 detecting that one or other of the two triggering levels has been reached, the level on line 228 remains constant at the new value until the other triggering level is detected.

The apparatus of FIG. 3 also includes an integrator 250 which is connected to receive the output from the pulse generator 220. The integrator 250 integrates the output from the pulse generator and supplies the integrated output to two AND gates 252 and 254. AND gate 252 is enabled when line 228 is energized, while AND gate 254 is enabled, through an inverter 255, when line 228 is de-energized. Stores 256 and 258 are respectively connected to the outputs of the AND gates, and these stores feed a subtracting amplifier 260 whose output is indicated on the meter 262.

Figure 5:
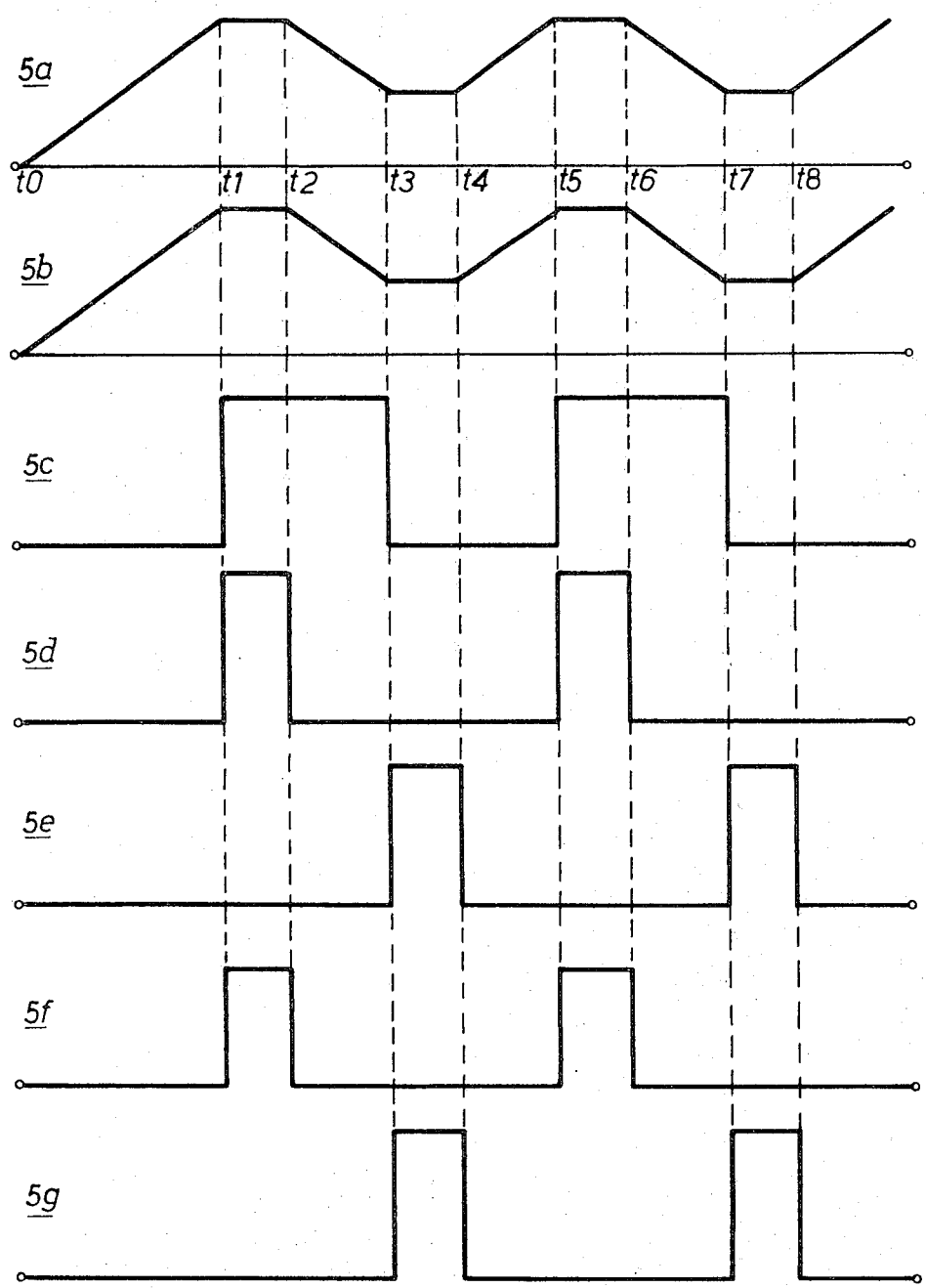

The operation of the apparatus of FIG. 3 will now be described with particular reference to FIGS. 4, 5 and 6.

FIG. 4 shows the output from the pulse generator 220. This comprises an ON pulse 221, whose width, but not its amplitude, is variable, followed by an OFF pulse 222 which is of fixed width.

It will be asumed initially that the flow rate is constant. At time $t0$, FIG. 5, the output (FIG. 5a) from the ramp generator 224 is zero. Therefore, the lengths of the ON periods from the pulse generator 220 are minimal, the heat input supplied to the hot junction 8 is negligible, and thus the thermocouple E.M.F. produced during the OFF periods of the pulse generator 220 is negligible as indicated in FIG. 5b. The output from the ramp generator 224 now increases linearly (FIG. 5a) thus increasing the lengths of the ON periods of the pulse generator 220 and increasing the heat input supplied to the hot junction 8. Therefore, the thermocouple E.M.F. produced during the OFF period of the pulse generator 220 also increases as shown in FIG. 5b. At time $t1$, the output from the differential amplifier 126 is sufficient to trigger the level detecting circuit 226 at its upper level thus energizing the line 228 (FIG. 5c). This triggers the delay circuit 230 (FIG. 5d) and causes the amplitude of the ramp generator 224 to be held constant (FIG. 5a). Therefore, the lengths of the ON periods of the pulse generator 220 are held constant and so is the output from the differential amplifier 126 (see FIG. 5b). At time $t2$, the delay period of the delay circuit 230 expires (FIG. 5d) and the ramp generator 224 is triggered by means of the line 238 so as to commence decreasing its output. The lengths of the ON periods of the pulse generator 220 thus decrease resulting in a decrease of the power input to the hot junction 8 and a consequent decrease in the output from the differential amplifier 126 (see FIG. 5b). At time $t3$, the output from the amplifier 126 reaches the lower triggering level of the detector circuit 226 and line 238 is de-energized (FIG. 5c). Therefore, delay circuit 242 is triggered (FIG .5e) and halts the ramp generator 224 (FIG. 5a) so as to hold constant the lengths of the ON periods of the pulse generator 220 and thus to hold constant the output of the differential amplifier 126 (FIG. 5b). At time $t4$, the delay period of the delay circuit 242 expires (FIG. 5e) and line 244 is energized so as to cause the ramp generator 224 to increase its amplitude again.

The procedure described above continuously repeats so that the output from the differential amplifier 126 cycles between the two triggering levels established by the detector circuit 226.

FIGS. 5f and 5g show how the gates 252 and 254 are respectively enabled for the duration of the time periods established by the delay circuits 230 and 242. During the times when the gate 252 is open, the integrator 250 feeds into the store 256 a relatively high value signal V1 (FIG.

6a) reflecting the relatively high value of the mark/space ratio of the pulse generator 220 during these periods. During the periods when the gate 254 is enabled, however, the integrator 250 feeds into the store 258 only a relatively low value signal V2 (FIG. 6b), reflecting the low mark/space ratio of the pulse generator during these periods. The subtracting amplifier 260 continuously subtracts the signal stored in the store 258 (V2) from that stored in the store 256 (V1) and registers the result on the meter 262.

For so long as the flow rate remains constant the indication on the meter 262 also remains constant. This indication represents the power required to be applied to the hot junction 8 to change its temperature between two fixed temperature values respectively established by the two triggering levels of the detector circuit 226. If now the flow rate increases from the constant value assumed above, a greater heat input to the hot junction 8 will be required in order to change the temperature by this fixed amount, because of the greater heat loss due to the increased fluid flow. In other words, the mark/space ratio of the pulse generator 220 will have to rise to a higher value before the upper triggering level of the circuit 226 is reached. Therefore the signal fed into the store 256 by the integrator 250 will be greater and will result in a higher indication on the meter 262. If, on the other hand, the flow rate decreases, the heating power required to raise the temperature of the hot junction 8 of the thermocouple between the two fixed temperatures established by the level detecting circuit 226 will decrease, and therefore the signal fed into the store 256 by the integrator 250 will be reduced resulting in a reduced indication on the meter 262.

Therefore, the meter 262 can be calibrated in terms of fluid flow.

The apparatus of FIG. 3, by cycling the hot junction 8 between the two fixed temperatures established by the level detector circuit 226, avoids the necessity, applicable to the other two forms of the apparatus described, of initially setting up the apparatus under zero flow conditions.

What is claimed is:

1. Fluid-flow responsive apparatus, comprising
thermocouple means including at least two thermocouple junctions,
means mounting at least one said junction in heat exchanging relationship with the said fluid,
an electrical multivibrator circuit arranged to produce a series of electrical output pulses and operatively connected to the thermocouple means to cause a heat input to be applied to the said one junction thereof for the duration of each said pulse whereby to heat the said one junction to a higher temperature than the other junction of the thermocouple means,
output means connected to receive the thermocouple E.M.F. produced by the two junctions between the said pulses and operative to produce an electrical output signal dependent thereon, and
indicating means connected to produce an indication dependent on the said heat input which indication is indicative of the fluid flow rate.

2. Apparatus according to claim 1, including control means connected to the multivibrator circuit and operable to adjust the lengths of the said pulses, while maintaining their amplitude constant, whereby to adjust the said heat input, and means connected to sense when the mean value of the output signal has a predetermined level, the indicating means being operative to produce an indication dependent on the lengths of the said pulses which indication is indicative of the fluid flow rate when the means value of the electrical output signal has the said predetermined level.

3. Apparatus according to claim 2, in which the output means comprises polarity-sensitive amplifying means connected to the two junctions so as to be responsive to the thermocouple E.M.F. produced thereby between the said pulses, and
unidirectional conducting means connected between the input and output of the amplifying means and so polarised with respect to the amplifying means as to minimize the output of the amplifying means during the said pulses.

4. Apparatus according to claim 1, including control means having an input connected to receive the said output signal and an output connected to the multivibrator circuit and operative in response to the said output signal to repeatedly vary the lengths of the said pulses such that the output signal cycles between upper and lower predetermined levels respectively representing different predetermined temperature differences between the two said junctions, the indicating means comprising means connected to receive the output from the electrical multivibrator circuit and operative to compare the lengths of the said pulses when the output signal reaches the upper predetermined level with the lengths of the said pulses when the output signal reaches the lower predetermined level whereby to produce the said indication in dependence on the difference between the two lengths compared.

5. Apparatus according to claim 4, including delaying means connected to the control means and operative to hold the lengths of the pulses constant for a predetermined duration starting when the output signal reaches each said level, and in which the indicating means comprises
integrating means connected to receive the pulses from the electrical multivibrator circuit and operative to produce a first integrated output representing the mean value of the pulses produced during each said duration which starts when the output signal reaches the upper predetermined level and a second integrated output representing the mean value of the pulses produced during each said duration which starts when the output signal reaches the lower predetermined level, and
means operative to subtract the second integrated output from the first integrated output whereby to produce the said indication.

6. Apparatus according to claim 5, in which the control means comprises
a ramp generating circuit operative to produce a variable amplitude signal and connected to control the multivibrator circuit whereby the lengths of the said pulses are proportional to the instantaneous amplitude of the ramp signal,
a level detecting circuit connected to receive and measure the output signal and to produce a first control signal when the output signal reaches the said upper predetermined level and a second control signal when the output signal reaches the said lower predetermined level,
means responsive to the first control signal to cause the ramp signal to decrease progressively in amplitude, and
means responsive to the second control signal to cause the ramp signal to increase progressively in amplitude.

7. Apparatus according to claim 1, including means operative to adjust the amplitudes of the said pulses, while maintaining their lengths constant, whereby to adjust the heat input to the said one junction, and means connected to sense when the mean value of the output signal has a predetermined level, and in which the indicating means comprises means operative to produce an indication dependent on the amplitudes of the pulses whereby the said indication is indicative of the fluid flow rate when the mean value of the electrical output signal has the said predetermined level.

8. Apparatus according to claim 1, in which the output means includes amplifying means connected to the two junctions so as to be responsive to the thermocouple E.M.F. produced by the two junctions between the pulses and to produce the said output signal in dependence thereon, and electrically controlled switching means connected to the output of the amplifying means and controlled by the multivibrator circuit whereby to prevent production of an output from the amplifying means during the said pulses.

9. Apparatus according to claim 1, including detecting means connected to sense when the heat input to the said one junction is greater than a predetermined allowable limit, and switch means responsive to the detecting means to prevent further application of heat input to the said one junction when the allowable limit is exceeded.

10. Apparatus according to caim 1, in which the mutivibrator circuit comprises electrical pulses generating means having a variable mark/space ratio, and in which the output means comprises amplifying means connected to receive and amplify the thermocouple E.M.F. of the thermocouple junctions and means for opposing the input to the amplifying means during the on-periods of the pulse generating means whereby the output from the amplifying means during these periods is minimal, the apparatus also including means operative to adjust the mark/space ratio of the pulse generating means so as to set the mean output of the amplifying means to a predetermined value, and the indicating means comprising means connected to produce an indication dependent on the value of the said ratio when the mean output of the amplifying means has the predetermined value, the said indication being a measure of the rate of fluid flow.

11. Apparatus according to claim 10, in which the indicating means comprises a voltmeter connected across the said one junction whereby to measure the voltage thereacross and to indicate the said ratio.

12. Apparatus according to claim 10, in which the amplifying means is a differential amplifier and in which the said means for opposing the input to the amplifying means during the on-periods of the pulse generating means comprises a first diode so connected between the input and output of the amplifying means as to provide substantial negative feedback therefor during the on-periods, and including a second diode connected to the electrically energised during the on-periods and operative to provide a further input to the amplifying means, during the on-periods of the pulse generating means, which further input is arranged to be dependent on the forward voltage drop across the second diode and opposes the effect on the amplifying means of the forward voltage drop across the first diode.

13. Apparatus according to claim 12, including resistance means connected in series with the second diode and operative to provide a pre-selected input signal to the amplifying means during the on-periods of the pulse generating means, which preselected input signal is such that the resultant output from the amplifying means is substantially equal to the output from the amplifying means which exists during the off-periods of the pulse generating means when the mean value of the output from the amplifying means has the said predetermined value.

References Cited
UNITED STATES PATENTS

| | | | |
|---|---|---|---|
| 3,076,338 | 2/1963 | Peltola | 73—362 |
| 3,498,128 | 3/1970 | Calvet | 73—204 |

CHARLES A. RUEHL, Primary Examiner